US012571324B2

(12) United States Patent
Lacombe et al.

(10) Patent No.: US 12,571,324 B2
(45) Date of Patent: Mar. 10, 2026

(54) ASSEMBLY FOR AN AIRCRAFT TURBOMACHINE, AND AIRCRAFT TURBOMACHINE

(71) Applicant: SAFRAN CERAMICS, Le Haillan (FR)

(72) Inventors: Benjamin Lacombe, Moissy-Cramayel (FR); Maxime François Roger Carlin, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/839,122

(22) PCT Filed: Feb. 13, 2023

(86) PCT No.: PCT/FR2023/050185
§ 371 (c)(1),
(2) Date: Aug. 16, 2024

(87) PCT Pub. No.: WO2023/156726
PCT Pub. Date: Aug. 24, 2023

(65) Prior Publication Data
US 2025/0163817 A1 May 22, 2025

(30) Foreign Application Priority Data
Feb. 21, 2022 (FR) ........................................ 2201514

(51) Int. Cl.
*F01D 11/00* (2006.01)
*F01D 9/02* (2006.01)

(52) U.S. Cl.
CPC ................ *F01D 11/00* (2013.01); *F01D 9/02* (2013.01); *F05D 2240/55* (2013.01)

(58) Field of Classification Search
CPC ......... F01D 9/02; F01D 11/00; F05D 2240/55
See application file for complete search history.

(56) References Cited

U.S. PATENT DOCUMENTS 4,767,260 A * 8/1988 Clevenger ............. F01D 11/005
415/115
4,902,198 A * 2/1990 North ......................... F01D 9/04
415/115

(Continued)

FOREIGN PATENT DOCUMENTS

EP 3095961 A1 11/2016
EP 3109043 A1 12/2016

(Continued)

OTHER PUBLICATIONS

International Search Report mailed Apr. 13, 2023, issued in corresponding International Application No. PCT/EP2023/050185, filed Feb. 13, 2023, 7 pages.

(Continued)

*Primary Examiner* — Nathaniel E Wiehe
*Assistant Examiner* — Aye S Htay
(74) *Attorney, Agent, or Firm* — Christensen O'Connor Johnson Kindness PLLC

(57) ABSTRACT

An assembly for an aircraft turbo machine having a plurality of sectors made of a CMC and a plurality of sealing tongues which are mounted between the sectors. Each of these tongues include a first longitudinal edge engaged in a slot in a lateral edge of one of the sectors, and a second longitudinal edge engaged in a slot in a lateral edge of an adjacent sector. Each of the first and second edges have a rectilinear intermediate portion extending between two end portions of convex curved shape. The slots can have shapes complementary to these portions wherein contact of the tongue in the slot over the entire longitudinal extent of the tongue is ensured. An aircraft turbomachine can include at least one such assembly.

9 Claims, 4 Drawing Sheets

(56) References Cited

U.S. PATENT DOCUMENTS 5,154,577 A * 10/1992 Kellock ................ F01D 11/005 415/134
5,158,430 A * 10/1992 Dixon ................... F01D 11/005 415/134
5,624,227 A * 4/1997 Farrell ................... F16J 15/061 277/650
5,865,600 A * 2/1999 Mori ......................... F01D 5/06 416/198 A
5,934,687 A * 8/1999 Bagepalli ............... F16J 15/122 277/653
5,997,247 A * 12/1999 Arraitz ...................... F01D 9/02 277/654
7,217,081 B2 * 5/2007 Scheurlen ................. F01D 5/22 277/642
7,527,472 B2 * 5/2009 Allen .................... F01D 11/008 277/648
8,240,985 B2 * 8/2012 Martin .................. F01D 11/005 415/173.1
8,684,673 B2 * 4/2014 Salazar ................. F01D 11/005 415/230
9,945,484 B2 * 4/2018 Moehrle ............... F01D 11/003
2005/0179215 A1 * 8/2005 Kono ................... F16J 15/0887 277/628
2018/0371947 A1 12/2018 Sippel et al.
2020/0063586 A1 * 2/2020 Filippi .................... F01D 9/047

FOREIGN PATENT DOCUMENTS

EP 3663528 A1 6/2020
FR 3070715 A1 3/2019
FR 3072825 A1 4/2019
FR 3103012 A1 5/2021

OTHER PUBLICATIONS

Written Opinion mailed Apr. 13, 2023, issued in corresponding International Application No. PCT/EP2023/050185, filed Feb. 13, 2023, 8 pages.

* cited by examiner

[Fig.1]
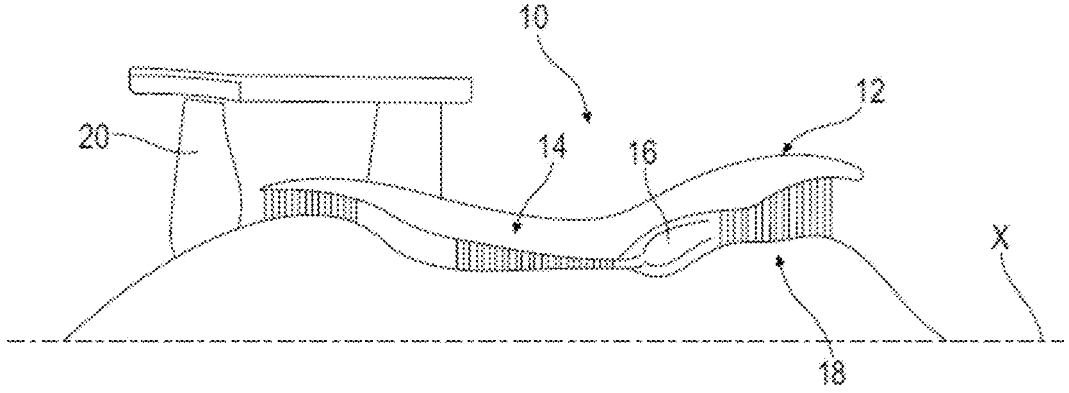
[Fig.2]
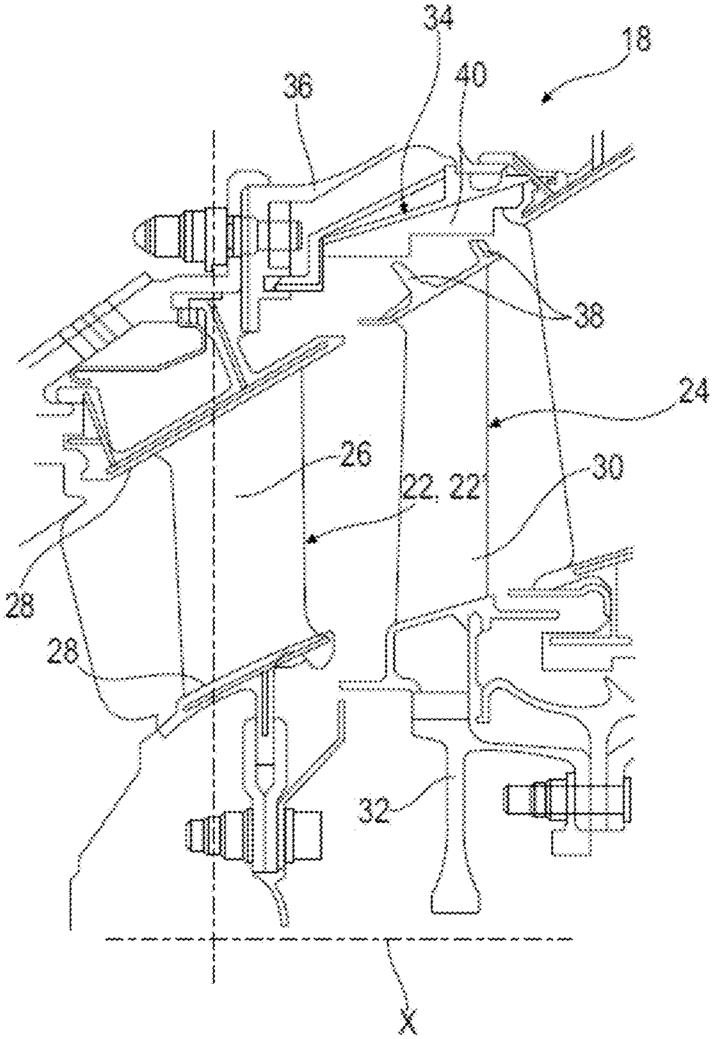

[Fig.3]
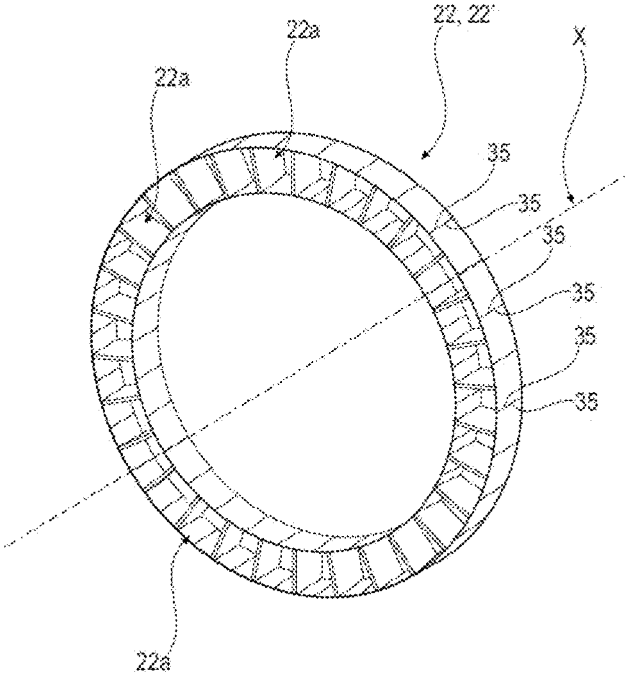
[Fig.4]
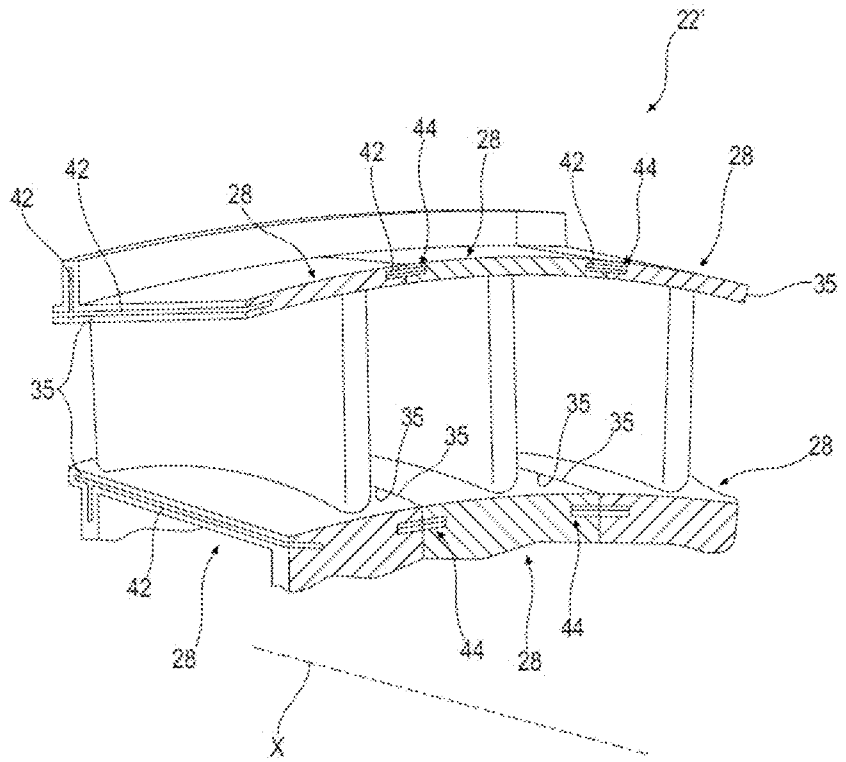

[Fig.5]
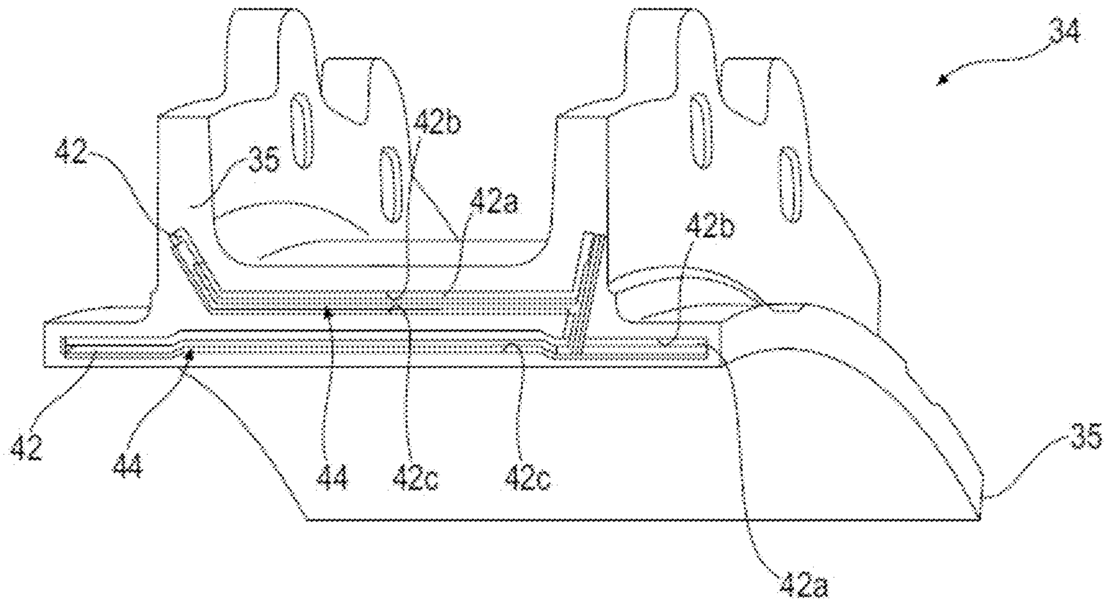
[Fig.6]
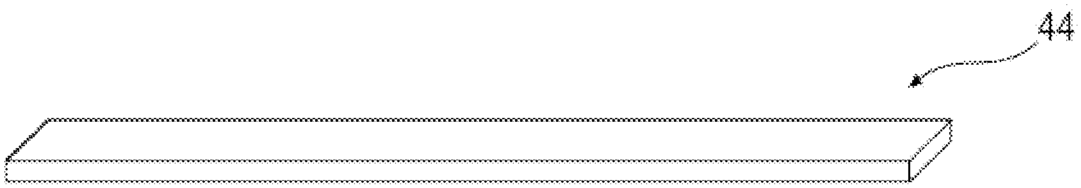

[Fig.7]
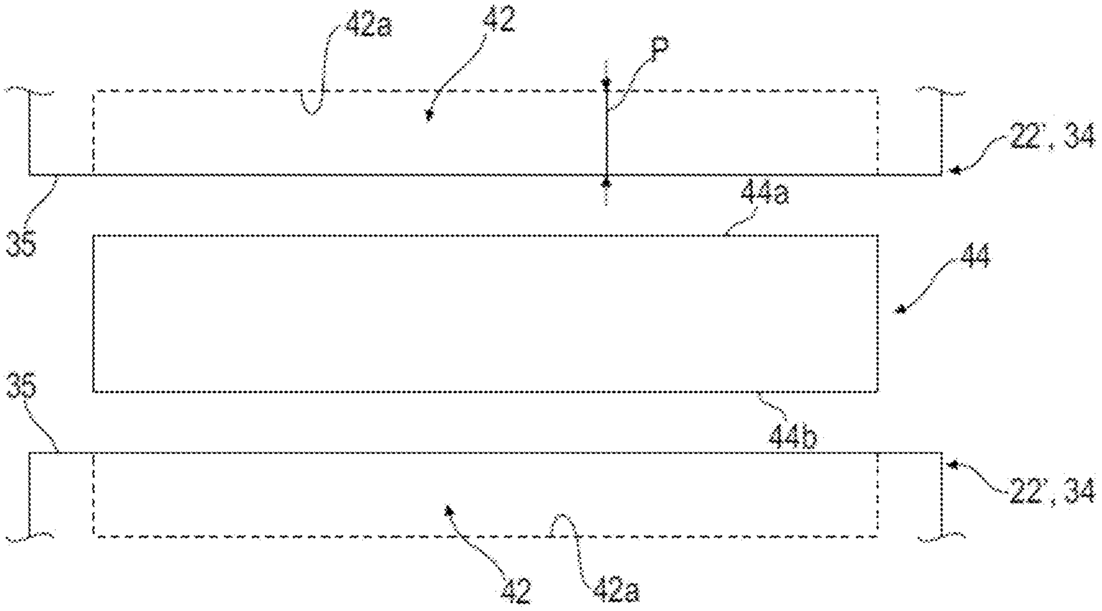
[Fig.8]
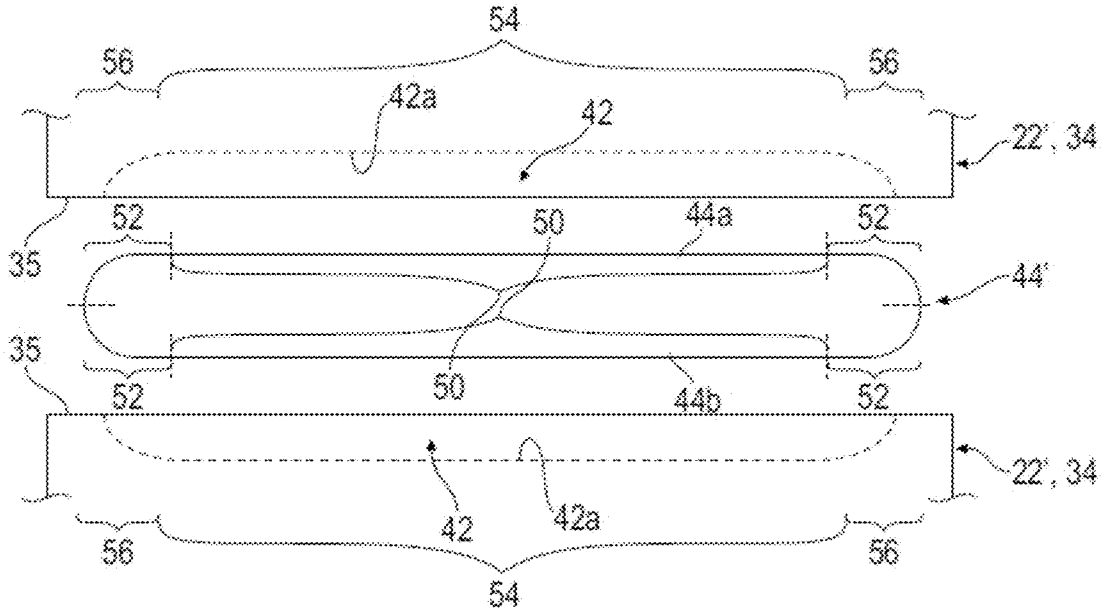

ASSEMBLY FOR AN AIRCRAFT TURBOMACHINE, AND AIRCRAFT TURBOMACHINE

CROSS-REFERENCE TO RELATED APPLICATIONS

This application is a National Stage of International Application No. PCT/FR2023/050185, filed Feb. 13, 2023, which claims priority to French Patent Application No. 2201514, filed Feb. 21, 2022, the entire disclosures of which are hereby incorporated by reference in their entirety for all purposes.

TECHNICAL FIELD OF THE INVENTION

This invention relates to an assembly for an aircraft turbomachine, and to an aircraft turbomachine comprising this assembly.

TECHNICAL BACKGROUND

The prior art comprises in particular the documents FR-A1-3 070 715, FR-A1-3 072 825, FR-A1-3 103 012, EP-A1-3 109 043, EP-A1-3 095 961, US-A1-2018/371947 and EP-A1-3 663 528.

A turbomachine, as illustrated in FIG. 1, generally comprises a gas generator 12 comprising, from upstream to downstream with reference to the direction of gas flow, at least one compressor 14, an annular combustion chamber 16 and at least one turbine 18. A stream of air enters the gas generator 12 and is compressed in the compressors 14. The compressed air is mixed with fuel and burnt in the combustion chamber 16. The combustion gases leaving the chamber 16 are expanded in the turbines 18, which drive the rotors of the turbines 18 as well as the rotors of the compressors 14 and of a propeller, called the fan 20, located upstream of the gas generator 12. As illustrated in FIG. 2, a compressor 14 or a turbine 18 generally comprises several stages (compression for a compressor and expansion for a turbine) each comprising a stator blade 22 and a rotor blade 24.

The stator blade 22 comprises an annular row of fixed vanes or blades 26 and is called a compressor stator vane in the case of a compressor 14 and a turbine stator vane 22' in the case of a turbine 18. The blades 26 extend between two coaxial annular platforms 28, which extend around the longitudinal axis X of the turbomachine, which is the axis of rotation of its rotors.

The rotor blade 24 also comprises an annular row of blades 30 carried by a disc 32. The rotor blade rotates inside a sealing ring 34 supported by a casing 36. The rotor blade 24 comprises, for example, annular lips 38 at its outer periphery, which can cooperate by friction with an abradable coating 40 located at the inner periphery of the sealing ring 34, to provide an axial seal between the rotor blade 24 and the ring 34 during operation.

It is known to sectorise a turbine stator vane 22' or a sealing ring 34. The turbine stator vane 22' or the ring 34 then comprises a number of circumferentially oriented sectors arranged side by side around the axis X (see FIG. 3).

It is important to ensure a seal between the sectors in operation, to avoid gas leaks outside the flow duct of the gas. To achieve this, the lateral edges 35 of the sectors facing each other are provided with slots 42 for housing sealing tongues 44 (see FIGS. 4 and 5).

FIG. 4 shows the seal between the lateral edges 35 facing the sectors of the platforms 28 of the turbine stator vane 22', thanks to the assembly of tongues 44 in the slots 42 of these edges.

FIG. 5 shows the seal between the lateral edges 35 facing the ring sectors 34, by means of tongues 44 fitted in the slots 42 in these edges.

Each of the edges 35 may comprise one or more slots 42 for engaging one or more tongues 44.

Each of these tongues 44 has a generally elongated shape and comprises two opposite longitudinal edges engaged respectively in the slots 42 of two lateral edges 35 facing two adjacent sectors. It is therefore understood that the tongues 44 are distributed around the axis X of the turbine stator vane 22' or the ring 34 and are mounted between the sectors of the turbine stator vane 22' or the ring 34.

It is known to make a turbine stator vane 22' and a ring 34 of metal alloy. In this case, the tongues 44 are also made of metal alloy. The slots 42 are generally made by machining the lateral edges 35 of the sectors. EDM (Electro Discharge Machining) technology, for example, is used for this machining. The tongues 44 have a generally flat, parallelepiped shape (see FIG. 6) and the slots 42 for receiving the longitudinal edges **44*a*, 44*b* of these tongues 44 have complementary general shapes (see FIG. 7). In particular, the slots 42 have a constant depth P, i.e. the bottom 42*a* of each slot 42 is flat. This depth is measured here in a direction which is tangent to a circumference centered on the axis X and which is contained in a plane perpendicular to the axis X. In other words, the longitudinal ends of each slot 42 are at right angles. The bottom 42*a* of each slot is located between two walls 42*b*, 42*c* of the slot 42, which extend parallel to the general plane of the tongue 44 intended to be engaged in the slot 42 (see FIG. 5**).

It is also known to produce a turbine stator vane 22' and a ring 34 in ceramic matrix composite (CMC). The CMC materials have good mechanical properties, making them suitable for use as structural elements, and maintain these properties at elevated temperatures. The major constraint on turbomachines is its ability to withstand high temperatures. For example, an assembly made from CMC material has good resistance to high temperatures, which improves the overall efficiency of the turbomachine. In addition, this type of assembly reduces the weight of the turbomachine and therefore its fuel consumption.

The EDM machining is not suitable for making slots in a sector of CMC material. In fact, the use of EDM technology generates problems of sparking during machining due to the heterogeneity of the material, which results in degradation of the worn zone and degraded surface finishes in this zone. The machining of the slot by a machining tool is conceivable but is too expensive because it consumes too many tools that break quickly and can generate surface defects during this rupture resulting in the scrapping of the sector. There is therefore a need to improve the production of slots for receiving sealing tongues on CMC sectors, in order to reduce the duration and cost of this operation.

The present invention offers an improvement that provides a simple, effective and economical solution to this need.

SUMMARY OF THE INVENTION

The invention relates to an assembly for an aircraft turbomachine, this assembly having a generally annular shape around an axis and comprising several sectors disposed circumferentially side-by-side around the axis, these sectors being made of a ceramic matrix composite material and each comprising lateral edges that face lateral edges of adjacent sectors, the assembly further comprising several sealing tongues which are distributed around the axis and mounted between the sectors, each of these tongues having a generally elongate shape and comprising a first longitudinal edge engaged in a slot in a lateral edge of one of the sectors, and a second longitudinal edge, opposite the first edge, and engaged in a slot of a lateral edge facing an adjacent sector, characterised in that each of the first and second edges comprises a rectilinear intermediate portion extending between two end portions of convexly curved shape, and in that the slots have shapes complementary to these portions so as to ensure contact of the tongue in the slot over the entire longitudinal extent of these portions.

The present invention thus proposes to modify the shape of the tongues and the slots for receiving these tongues. The inventors have found that it is the design of the flat-bottomed ends of the tongues in the previous technique that is problematic and generates manufacturing defects and accelerated wear or breakage of the machining tools. It is easier to produce tongues with rounded ends and, in particular, to machine the slots to receive these tongues. The tongues have complementary shapes to the slots. The rectilinear intermediate portions of the tongues rest on complementary portions of the bottoms of the slots, and the curved end portions of the tongues also rest on complementary portions of the bottoms of the slots. There is therefore continuous (and, for example, "linear") contact over the entire longitudinal extent of the portions and therefore substantially over the entire length of the tongue.

The assembly according to the invention may comprise one or more of the following characteristics, taken in isolation from each other, or in combination with each other:

- the end portions each have the shape of a portion of a circle or ellipse;
- at each of the longitudinal ends of each tongue, the end portion of the first edge joins the end portion of the second edge so that they extend continuously with each other;
- the intermediate portion has a longitudinal extent which represents between 70 and 90% of the longitudinal extent of the corresponding tongue;
- each end portion has a longitudinal extent which represents between 5 and 15% of the longitudinal extent of the corresponding tongue;
- the assembly forms a turbine stator vane of the turbine, the sectors being sectors of the turbine stator vane each comprising two platforms between which at least one blade extends;
- the assembly forms a sealing ring for a compressor or turbine;
- —said contact takes place mainly in a circumferential direction with respect to said axis.

The invention also relates to an aircraft turbomachine, comprising at least one assembly as described above.

BRIEF DESCRIPTION OF THE FIGURES

Further characteristics and advantages will be apparent from the following description of a non-limiting embodiment of the invention with reference to the appended drawings wherein:

FIG. 1 is a schematic half-view of an aircraft turbomachine in axial section;

FIG. 2 is a schematic half-view in axial section of a turbine stage of an aircraft turbomachine;

FIG. 3 is a perspective view of an assembly within the meaning of the invention, in this case a turbine stator vane of the turbine;

FIG. 4 is a perspective view of two adjacent sectors of the assembly shown in FIG. 3;

FIG. 5 is a perspective view of a sector of another assembly within the meaning of the invention, in this case a sealing ring;

FIG. 6 is a schematic perspective view of a sealing tongue;

FIG. 7 is a schematic view of the sealing tongue of FIG. 6 arranged between two sectors comprising slots for mounting this tongue;

FIG. 8 is a schematic view of a sealing tongue arranged between two sectors comprising slots for mounting this tongue, and illustrates one embodiment of the present invention.

DETAILED DESCRIPTION OF THE INVENTION

FIGS. 1 to 7 have been described above.

Although these figures have been described in the context of the present technique and to pose the technical problem solved by the present invention, they illustrate the general context of the invention and the description of these figures can therefore be used to describe the general context of the invention and certain characteristics of this invention.

The invention thus relates to an assembly as described above, i.e. in particular a turbine stator vane 22' or a sealing ring 34.

The assembly has a generally annular shape about an axis X, which is the longitudinal axis of the turbomachine when the assembly is mounted in a turbomachine 10 such as that shown in FIG. 1.

The assembly comprises a number of sectors arranged circumferentially side by side around the axis X, as shown in FIG. 3.

These sectors are made of a ceramic matrix composite (CMC) and each comprise lateral edges 35 that face the lateral edges 35 of adjacent sectors.

The assembly also comprises a number of sealing tongues 44' which are distributed around the axis X and mounted between the sectors (see FIG. 8). Each of these tongues 44' has a generally elongated shape and comprises a first longitudinal edge **44*a* engaged in a slot 42 in a lateral edge 35 of one of the sectors, and a second longitudinal edge 44*b*, opposite the first edge 44*a*, and engaged in a slot 42 in a lateral edge 35** facing an adjacent sector.

According to the invention, one embodiment of which is illustrated in FIG. 8, the first and second edges **44*a*, 44*b* of each of the tongues 44' each comprise a rectilinear intermediate portion 50 extending between two convexly curved end portions 52. The slots 42 have complementary shapes to these portions 50, 52 so as to ensure contact, for example linear contact, of the tongue 44' in the slot 42 over the entire longitudinal extent of these portions 50, 52. The bottom 42*a* of each of the slots 42 thus comprises a rectilinear intermediate portion 54 extending between two concave curved end portions 56**.

The end portions 52 and 56 preferably each have the shape of a portion of a circle or ellipse, as shown in the drawing. Furthermore, as also illustrated, at each of the longitudinal ends of each tongue 44, the end portion 52 of the first edge **44*a* joins the end portion 52 of the second edge 44*b*** so that they extend in continuity with each other.

The intermediate portion 50 preferably has a longitudinal extent of between 70 and 90% of the longitudinal extent of the corresponding tongue 44'. The intermediate portions 50 of each tongue 44' are preferably parallel to each other.

Each end portion 52 preferably has a longitudinal extent of between 5 and 15% of the longitudinal extent of the corresponding tongue 44'.

In a particular embodiment of the invention, each of the tongues 44' has a length of between 20 and 100 mm, and preferably between 30 and 60 mm. Each of the tongues 44' is between 2 and 10 mm wide, preferably between 3 and 6 mm. Each of the tongues 44' is between 1 and 5 mm thick.

The invention claimed is:

1. An assembly for an aircraft turbomachine, the assembly having an annular shape around an axis of rotation, the assembly comprising:

a plurality of sectors disposed circumferentially side-by-side around the axis of rotation, the plurality of sectors being made of a ceramic matrix composite material and each of the sectors comprising lateral edges that face lateral edges of adjacent sectors of the plurality of sectors; and a plurality of sealing tongues which are distributed around the axis of rotation and mounted between the plurality of sectors, each of the plurality of tongues having an elongate shape and comprising:

a first longitudinal edge extending along the axis of rotation and engaged in a slot in a lateral edge of one of the plurality of sectors; and a second longitudinal edge opposite the first longitudinal edge and extending along the axis of rotation, the second longitudinal edge engaged in a slot in a lateral edge of an adjacent sector, wherein the first and second longitudinal edges of each of the plurality of tongues comprise a rectilinear intermediate portion extending between two axial tongue end portions each having a convexly curved circumferential seal face protruding from the rectilinear intermediate portion in a direction along the axis of rotation, wherein the slots of each of the plurality of sectors have shapes complementary to the rectilinear intermediate portions and the convexly curved circumferential seal faces to ensure contact of the tongue in the slot over the entire longitudinal extent of the tongue, and wherein each of the slots of each of the plurality of sectors has a bottom comprising a rectilinear intermediate portion extending between two axial slot end portions having concavely curved circumferential seal faces, the rectilinear intermediate portion of each of the slots being complementary to the rectilinear intermediate portion of the first and second longitudinal edges of each of the plurality of tongues, and the two concavely curved circumferential seal faces of each of the slots being complementary to the two convexly curved circumferential seal faces of each of the tongues.

2. The assembly according to claim 1, wherein the two end portions of each of the plurality of tongues have the shape of a portion of a circle or ellipse.

3. The assembly according to claim 1, wherein, at each of the longitudinal ends of each tongue, the end portion of the first edge joins the end portion of the second edge so that they extend continuously with each other.

4. The assembly according to claim 1, wherein the intermediate portion has a longitudinal extent which represents from 70% to 90% of the longitudinal extent of the corresponding tongue.

5. The assembly according to claim 1, wherein each end portion has a longitudinal extent which represents from 5% to 15% of the longitudinal extent of the corresponding tongue.

6. The assembly according to claim 1, wherein the assembly forms a turbine stator vane of the aircraft turbomachine, the plurality of sectors being sectors of the turbine stator vane and each sector comprising two platforms between which at least one blade extends.

7. The assembly according to claim 1, wherein the assembly forms a sealing ring for a compressor or a turbine.

8. An aircraft turbomachine comprising at least one assembly according to claim 1.

9. The assembly according to claim 1, wherein for each of the plurality of tongues, the convexly curved circumferential seal face is a circular or elliptical portion connecting the first longitudinal edge to the second longitudinal edge.

* * * * *